United States Patent
McFarland et al.

[19]

[11] Patent Number: 5,951,040
[45] Date of Patent: Sep. 14, 1999

[54] AIR BAG INFLATOR WITH PRESSURE REGULATION

[75] Inventors: Eric R. McFarland; Lloyd G. Green, Jr., both of Mesa, Ariz.

[73] Assignee: TRW Inc., Lyndhurst, Ohio

[21] Appl. No.: 08/820,925

[22] Filed: Mar. 19, 1997

[51] Int. Cl.⁶ ................................................. B60R 21/26
[52] U.S. Cl. ...................... 280/736; 280/737; 280/741; 280/742
[58] Field of Search .................................. 280/736, 737, 280/741, 742

[56] References Cited

U.S. PATENT DOCUMENTS

| | | | |
|---|---|---|---|
| 3,960,390 | 6/1976 | Goetz | ........................................ 280/737 |
| 5,236,675 | 8/1993 | Swain et al. | . |
| 5,437,472 | 8/1995 | Kuretake et al. | . |

FOREIGN PATENT DOCUMENTS 9425315  11/1994  WIPO .

*Primary Examiner*—Eric Culbreth
*Attorney, Agent, or Firm*—Tarolli, Sundheim, Covell, Tummino & Szabo

[57] ABSTRACT

An air bag inflator (10) includes a housing (20) and an inflation fluid source (140) in the housing actuatable to provide inflation fluid under pressure. The housing (20) is deformable due to the pressure of inflation fluid in the housing upon actuation of the inflation fluid source (140). The housing (20) has a fluid outlet (52) for directing flow of inflation fluid out of the housing. A control passage (160) is located between the inflation fluid source (140) and the fluid outlet (52). The control passage (160) has a smaller flow area than the fluid outlet (52). The inflator (10) further includes portions (84, 82, 110, 42) for causing substantially all inflation fluid flowing between the inflation fluid source (140) and the fluid outlet (52) to flow through the control passage (160). The flow area of the control passage (160) increases due to deformation of the housing (20). The flow area of the control passage (160) varies in accordance with the pressure of inflation fluid in the housing (20) upon actuation of the inflation fluid source (140).

17 Claims, 4 Drawing Sheets

AIR BAG INFLATOR WITH PRESSURE REGULATION

BACKGROUND OF THE INVENTION

1. Technical Field

The present invention relates to an apparatus for inflating an inflatable vehicle occupant protection device.

2. Description of The Prior Art

An inflatable vehicle occupant protection device, such as an air bag, is deployed upon the occurrence of a vehicle crash. The air bag is part of a vehicle occupant protection apparatus which further includes a crash sensor and an inflator. The inflator includes a housing and an inflation fluid source, such as a solid propellant, in the housing. When the crash sensor senses a crash-indicating condition of at least a predetermined threshold level, the inflator is actuated and produces inflation fluid under pressure in the inflator housing. The pressurized inflation fluid is directed out of the inflator housing and inflates the air bag into the vehicle occupant compartment. When the air bag is deployed in this manner, it helps to protect an occupant of the vehicle from a forceful impact with parts of the vehicle as a result of the crash.

When the inflator is actuated at an elevated ambient temperature, the pressure of the inflation fluid in the inflator housing increases. An inflator must be strong enough structurally to contain these elevated pressures. If the pressure in the inflator housing is thus increased, the mass flow rate of the inflation fluid flowing into the air bag can increase above the desired flow rate. Also, the possibility of such increased pressures may make it unfeasible to use a solid propellant which has a high burn rate exponent, that is, a high sensitivity to pressure variation.

SUMMARY OF THE INVENTION

The present invention is an apparatus for providing inflation fluid for inflating an inflatable vehicle occupant protection device. The apparatus comprises a housing and an inflation fluid source in the housing actuatable to provide inflation fluid under pressure. The housing is deformable due to the pressure of inflation fluid in the housing upon actuation of the inflation fluid source. The housing has a fluid outlet for directing flow of inflation fluid out of the housing to the inflatable device. The apparatus includes means for defining a control passage located between the inflation fluid source and the fluid outlet. The control passage has a smaller flow area than the fluid outlet. The apparatus further includes means for causing substantially all inflation fluid flowing between the inflation fluid source and the fluid outlet to flow through the control passage. The flow area of the control passage increases due to deformation of the housing. The flow area of the control passage varies in accordance with the pressure of inflation fluid in the housing upon actuation of the inflation fluid source.

BRIEF DESCRIPTION OF THE DRAWINGS

Further features of the present invention will become apparent to those skilled in the art to which the present invention relates from reading the following description with reference to the accompanying drawings, in which.

DESCRIPTION OF PREFERRED EMBODIMENTS OF THE INVENTION

Figure 1:
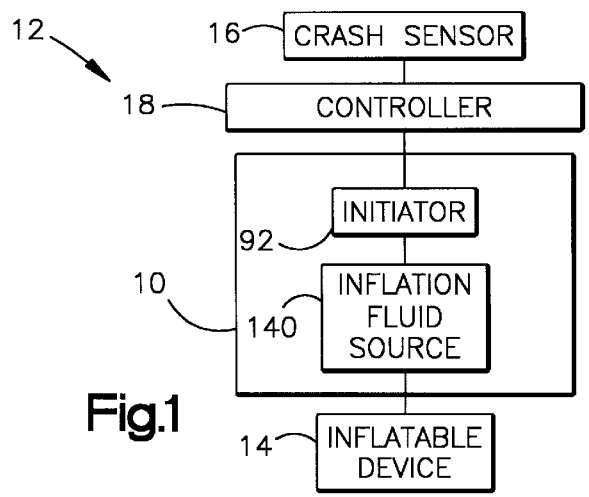
FIG. 1 is a schematic view of a vehicle occupant protection apparatus including an inflator constructed in accordance with a first embodiment of the present invention.

The present invention relates to an apparatus for providing inflation fluid for inflating an inflatable vehicle occupant protection device. As representative of the present invention, FIG. 1 illustrates schematically an inflator 10 which forms part of a vehicle occupant protection apparatus 12.

The apparatus 12 includes an inflatable vehicle occupant protection device 14. In the preferred embodiments of the invention, the protection device 14 is an air bag. Other inflatable vehicle occupant protection devices that can be used in accordance with the present invention include, for example, inflatable seat belts, inflatable knee bolsters, inflatable head liners or side curtains, and knee bolsters operated by inflatable air bags.

The inflator 10 is electrically actuatable to provide inflation fluid for inflating the air bag 14. When the air bag 14 is inflated, it extends into a vehicle occupant compartment (not shown) to help protect a vehicle occupant from a forceful impact with parts of the vehicle as a result of a crash.

The apparatus 12 also includes a crash sensor 16. The crash sensor 16 is a known device which senses a vehicle condition that indicates the occurrence of a crash. if the vehicle condition sensed by the crash sensor 16 is at or above a predetermined threshold level, it indicates the occurrence of a crash having at least a predetermined threshold level of severity. The threshold level of crash severity is a level at which inflation of the air bag 14 is desired for protection of a vehicle occupant.

The vehicle condition sensed by the crash sensor 16 preferably is sudden vehicle deceleration that is caused by a collision. The magnitude and duration of the deceleration are measured by the crash sensor 16. If the magnitude and duration of the deceleration meet or exceed predetermined threshold levels, they indicate the occurrence of a crash that meets or exceeds the predetermined threshold level of crash severity. A deployment signal is then transmitted to a controller 18 to indicate the occurrence of such a crash. The controller 18 sends an actuation signal to the inflator 10 to actuate the inflator.

Figure 3:
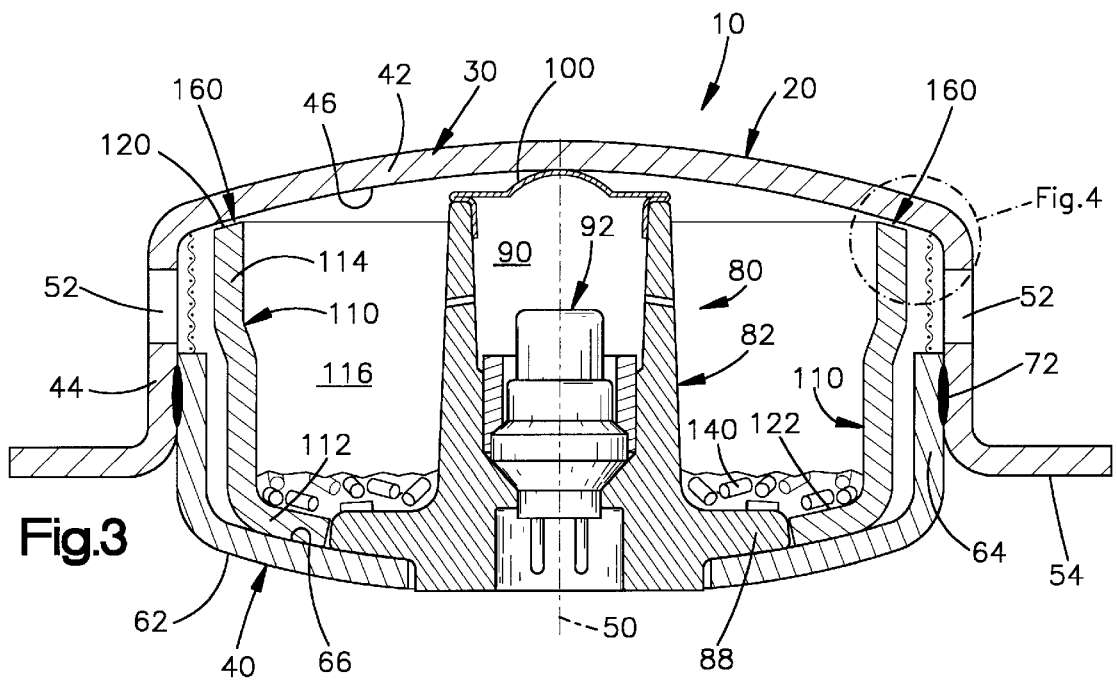
FIG. 3 is a view similar to FIG. 2, showing the inflator in an actuated condition.
Figure 4:
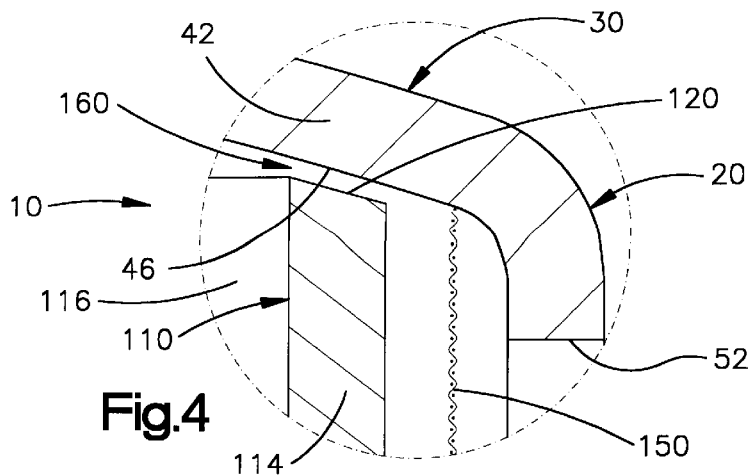
FIG. 4 is an enlarged view of a portion of FIG. 3.

The inflator 10 (FIGS. 2–4) includes a generally cylindrical housing or shell 20. The inflator 10 has a generally circular configuration as seen from above in FIGS. 2 and 3. The housing 20 includes a first or upper (as viewed in FIG. 2) housing part 30 and a second or lower (as viewed in FIG. 2) housing part 40.

The upper housing part 30 has an inverted, cup-shaped configuration including a radially extending end wall 42 and an axially extending side wall 44. The end wall 42 of the upper housing part 30 is domed, that is, has a curved configuration projecting away from the lower housing part 40. The end wall 42 has an inner side surface 46.

The side wall 44 of the upper housing part 30 has a cylindrical configuration centered on an axis 50 of the inflator 10. A plurality of inflation fluid outlets 52 are disposed in a circular array on the side wall 44. Each one of the inflation fluid outlets 52 extends radially through the side wall 44. The outlets 52 enable flow of inflation fluid out of the inflator 10 to inflate the air bag 14. The outlets 52, as a group, have a fixed, predetermined flow area. An annular inflator mounting flange 54 extends radially outward from the side wall 44 at a location below (as viewed in FIG. 2) the inflation fluid outlets 52.

The lower housing part 40 has a cup-shaped configuration including a radially extending end wall 62 and an axially extending side wall 64. The end wall 62 of the lower housing part 40 is domed, that is, has a curved configuration projecting away from the upper housing part 30. The end wall 62 has an inner side surface 66 presented toward the end wall 42 of the upper housing part 30. A circular opening 68 in the end wall 62 is centered on the axis 50.

Figure 2:
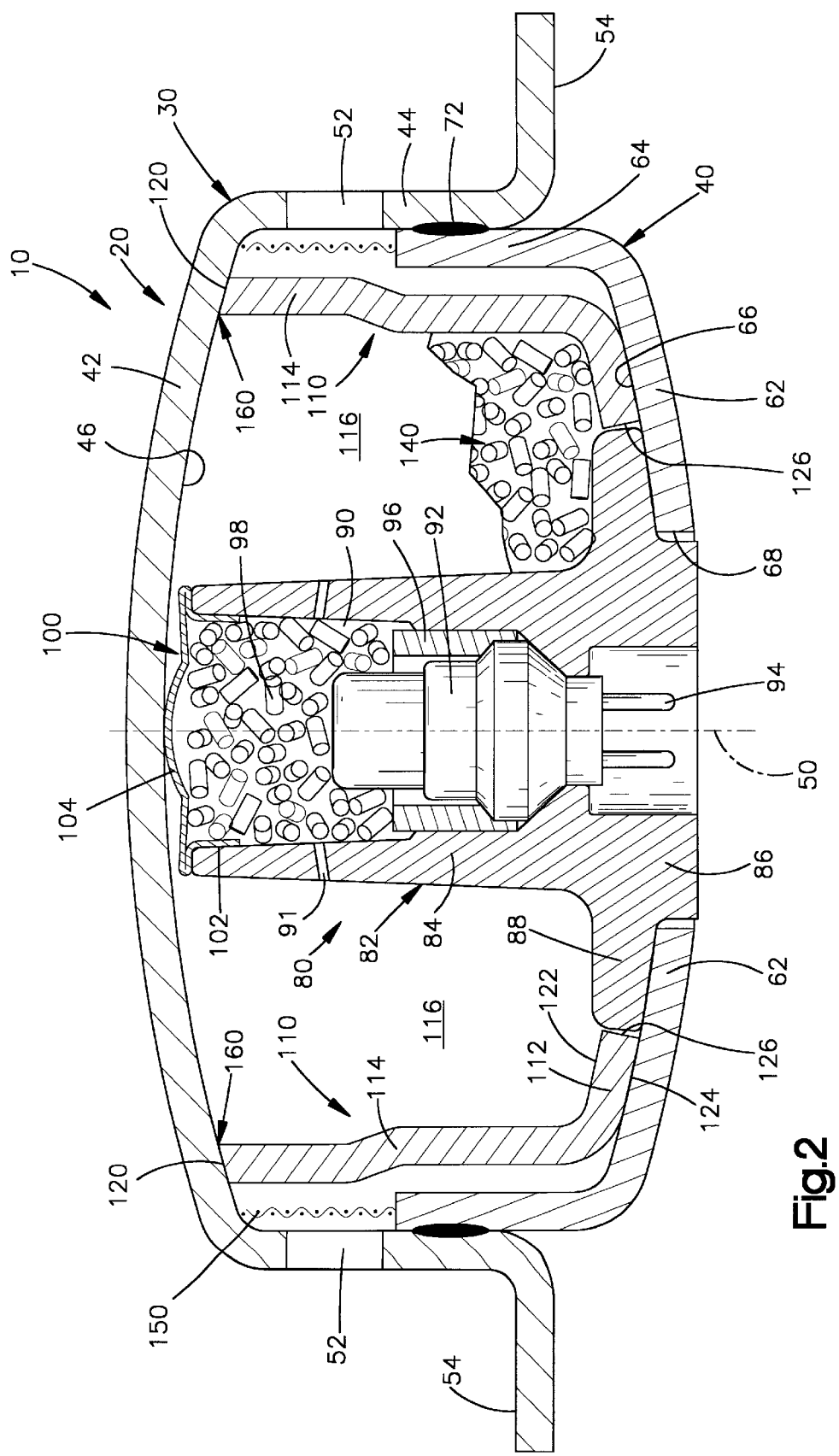
FIG. 2 is a sectional view showing the inflator of FIG. 1 in an unactuated condition.

The side wall 64 of the lower housing part 40 has a cylindrical configuration centered on the axis 50. The outer diameter of the side wall 64 of the lower housing part 40 is approximately equal to the inner diameter of the side wall 44 of the upper housing part 30. The lower housing part 40 is nested inside the upper housing part 30, as seen in FIG. 2. The side wall 64 of the lower housing part 40 is welded to the side wall 44 of the upper housing part 30 with a single, continuous weld 72.

The inflator 10 includes an initiator assembly 80. The initiator assembly 80 includes an initiator housing 82. The initiator housing 82 has a generally tubular configuration including a tapered, axially extending side wall 84, an end portion 86, and a flange 88.

The side wall 84 of the initiator housing 82 defines an ignition chamber 90 in the housing. A circular array of passages 91 is formed in the side wall 84. The passages 91 extend between the ignition chamber 90 and the exterior of the initiator housing 82. The end portion 86 of the initiator housing 82 extends into the central opening 68 in the end wall 62 of the lower housing part 40.

The initiator assembly 80 includes an initiator 92. The initiator 92 is a known device which is electrically actuatable by an electric current applied through terminals 94 to generate combustion products. A sleeve 96 is press fit between the initiator 92 and the side wall 84 of the initiator housing 82 to secure the initiator in position in the housing.

An ignition material 98 is located in the ignition chamber 90 of the initiator housing 82, adjacent to and in contact with the initiator 92. The ignition material 98 is a known material which is ignitable by the initiator 92 and which, when ignited, generates combustion products.

A metal cap 100 on the upper end of the initiator housing 82 contains the ignition material 98 in the ignition chamber 90. The cap 100 has an axially extending, cylindrical portion 102 which is press fit inside the side wall 84 of the initiator housing 82. A resilient, domed end wall 104 of the cap 100 extends across and closes the ignition chamber 90 in the initiator housing 82.

The flange 88 of the initiator housing 82 extends radially outward from the side wall 84 of the initiator housing. The flange 88 overlies the radially inner portion of the end wall 62 of the lower housing part 40. If desired, a seal (not shown), such as a gasket or a layer of sealant material, may be provided between the flange 88 of the initiator housing 82 and the end wall 62 of the lower housing part 40.

The initiator assembly 80 is trapped or captured axially between the upper housing part 30 and the lower housing part 40. Specifically, the distance between the flange 88 of the initiator housing and the cap 100 is selected so that, when the housing parts 30 and 40 are welded together with the initiator assembly 80 inside, the domed end wall 104 of the cap is deformed axially inward. The cap end wall 104 acts as a spring which, when thus compressed, biases the initiator housing 82 into engagement with the lower housing part 40. The flange 88 of the initiator housing 82 is pressed axially outward against or toward the end wall 62 of the lower housing part 40.

The inflator 10 includes a flow control member 110 in the form of a combustion cup. The combustion cup 110 has an annular configuration including a radially extending lower end wall 112 and an axially extending side wall 114. The walls 112 and 114 of the combustion cup 110 partially define a combustion chamber 116 inside the combustion cup.

The side wall 114 of the combustion cup 110 is disposed radially inward of the side walls 44 and 64 of the upper and lower housing parts 30 and 40, respectively. The combustion cup side wall 114 has a ring-shaped upper end surface 120. The upper end surface 120 has a generally frustoconical configuration which seals against the inner side surface 46 of the end wall 42 of the upper housing part 30.

The lower end wall 112 of the combustion cup 110 extends radially inward from the lower portion of the side wall 114 of the combustion cup. The lower end wall 112 has an inner side surface 122 which is presented toward the upper housing part 30. The lower end wall 112 has an outer side surface 124 which is in abutting engagement with the inner side surface 66 of the end wall 62 of the lower housing part 40. The axial length of the combustion cup 110 is selected so that the combustion cup is trapped or captured axially between the upper housing part 30 and the lower housing part 40.

The lower end wall 112 of the combustion cup 110 has a ring-shaped end surface 126. The end surface 126 of the lower end wall 112 of the combustion cup 110 is disposed adjacent to the flange 88 of the initiator housing 82. The initiator housing 82 helps to locate the combustion cup 110 radially in the inflator 10.

The inflator 10 includes an actuatable inflation fluid source 140 in the form of a solid propellant. The propellant 140 is located in the combustion chamber 116 in the combustion cup 110. The propellant 140 is a known material which is actuatable by the initiator assembly 80 and which, when actuated, produces inflation fluid in the form of gas under pressure for inflating the air bag 14. The propellant 140 is illustrated as being provided in the form of pellets. The propellant 140 could, alternatively, be provided in the form of small discs or tablets, or as large discs encircling the initiator housing 82.

The inflator 10 preferably includes a filter indicated schematically at 150. The filter 150 has an annular configuration and is disposed radially inward of the inflation fluid outlets 52, between the upper portion of the combustion cup side wall 114 and the side wall 44 of the upper housing part 30. The filter 150 may be any suitable device or assembly, such as a metal mesh or screen, for filtering particulate matter from the inflation fluid flowing out of the inflator 10 through the inflation fluid outlets 52.

The upper end surface 120 of the combustion cup side wall 114 and the inner side surface 46 of the upper housing part 30 define a control passage 160 (FIGS. 2–4) in the inflator 10. Because the combustion cup side wall 114 is cylindrical, the control passage 160 has an annular configuration extending around and centered on the axis 50. The control passage 160 is located between the inflation fluid source 140 and the fluid outlets 52.

Prior to actuation of the inflator 10, the end surface 120 of the combustion cup side wall 114 seals against the inner side surface 46 of the upper housing part end wall 42, so that the control passage 160 is closed and has zero flow area. The closed control passage 160 blocks fluid flow between the combustion chamber 116 and the fluid outlets 52, prior to actuation of the inflator 10. There is no other path for any significant amount of fluid to flow between the inflation fluid source 140 and the fluid outlets 52. Upon actuation of the inflator 10, as described below, the control passage 160 opens to enable inflation fluid to flow between the inflation fluid source 140 and the fluid outlets 52. The control passage 160, when open, has a smaller flow area than the fluid outlets 52.

In the event of a vehicle crash at or above the predetermined threshold level of crash severity, the inflator 10 is actuated by an electric signal applied to the terminals 94 of the initiator 92. The initiator 92 is actuated and produces combustion products which ignite the ignition material 98. The ignition material 98 produces combustion products which flow through the passages 91 into the combustion chamber 116.

The combustion products flowing into the combustion chamber 116 ignite the propellant 140. The propellant 140 combusts and produces inflation fluid under pressure in the combustion chamber 116. The pressure in the combustion chamber 116 rises rapidly to a pressure in the range of about 1,000 psi to about 2,000 psi or more.

The material thickness of the housing part end walls 42 and 62 is selected so that the end walls deform due to the pressure of inflation fluid in the housing 20 upon actuation of the inflation fluid source 140. Specifically, the end wall 42 of the upper housing part 30 deforms axially outward (in an upward direction as viewed in FIG. 3), from the condition shown in FIG. 2 to the condition shown in FIG. 3. Simultaneously, the end wall 62 of the lower housing part 40 deforms axially outward in the opposite direction, from the condition shown in FIG. 2 to the condition shown in FIG. 3. The amount of deformation or deflection of the end walls 42 and 62 is dependent on the pressure in the housing 20. That is, the higher the pressure in the housing, the more the end walls 42 and 62 deflect outward.

As a result of the deformation of the end walls 42 and 62 of the housing parts 30 and 40, the distance between the end wall of the upper housing part and the end wall of the lower housing part increases. The resilience of the end wall 104 of the cap 100 presses the flange 88 of the initiator housing 82 against the end wall 62 of the lower housing part 40, that is, in a downward direction as viewed in FIG. 3. At the same time, the pressure of the inflation fluid acting on the initiator housing flange 88 also forces the flange against the end wall 62 of the lower housing part 40. The biasing force of the cap 100, together with the force exerted by the inflation fluid on the flange 88, effects a fluid-tight seal between the initiator housing 82 and the lower housing part 40.

When the inflator housing 20 deforms, the combustion cup 110 is, also, no longer trapped axially between the upper housing part 30 and the lower housing part 40. The pressure of the inflation fluid in the combustion chamber 116, acting in a downward direction (as viewed in FIG. 3) on the lower portion 112 of the combustion cup 110, holds the combustion cup in engagement with the end wall 62 of the lower housing part 40. The combustion cup 110 moves with the end wall 62 of the lower housing part 40, away from the end wall 42 of the upper housing part 30.

The upper end surface 120 of the combustion cup 110 moves away from the inner side surface 46 of the end wall 42 of the upper housing part 30. The control passage 160 opens and its flow area increases, due to the deformation of the housing 20. The side wall 84 of the initiator housing 82, the initiator housing flange 88, the combustion cup 110, and the end wall 42 of the upper housing part 30 cooperate to direct all, or substantially all, of the inflation fluid flowing out of the combustion chamber 116 to flow through the control passage 160. There is no other path for any significant amount of fluid to flow between the inflation fluid source 140 and the fluid outlets 52.

Inflation fluid under pressure from the inflation fluid source 140 flows out of the combustion chamber 110, through the control passage 160, toward the inflation fluid outlets 52. The inflation fluid flows out along the entire 360° extent of the control passage 160. The fluid outlets 52 direct the inflation fluid to flow out of the housing 20 to the inflatable device 14.

The flow area of the control passage 160 varies in accordance with the pressure of inflation fluid in the housing 20. Specifically, the higher the pressure in the housing 20, the more the end walls 42 and 62 deflect or deform outward. The more the end walls 42 and 62 deflect outward, the more the end surface 120 of the combustion cup 110 moves away from the end wall of the upper housing part 30, and the bigger the control passage 160 becomes.

In one embodiment, the control passage 160 is typically about one-half millimeter in axial extent when the inflator 10 is actuated. Under extreme pressure conditions, the control passage 160 could have an axial extent of as much as two to three millimeters.

Because the flow area of the control passage 160 varies in accordance with the pressure of inflation fluid in the housing 20, the internal operating pressure of the inflator 10 is self-regulating. Any increased pressure in the combustion chamber 160 causes the control passage 160 to open further, thus allowing the pressure to be relieved and lowered. The range of peak operating pressures in the inflator 10 is, therefore, narrowed, reducing the structural requirements of the inflator housing 20 accordingly.

Because the peak pressures in the combustion chamber 116 are reduced by the increased opening of the variable control passage 160, effects of temperature change on the pressure in the combustion chamber 160 are minimized. This can enable the use of a propellant 140 which is more pressure sensitive, that is, which has a higher burn rate exponent.

Figure 5:
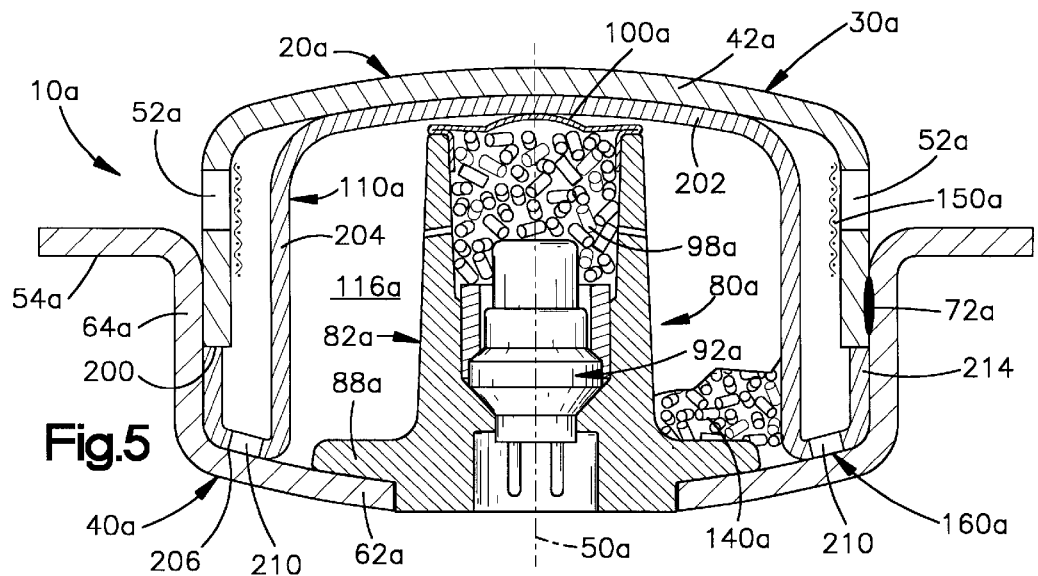
FIG. 5 is a sectional view of an inflator constructed in accordance with a second embodiment of the present invention, showing the inflator in an unactuated condition.
Figure 6:
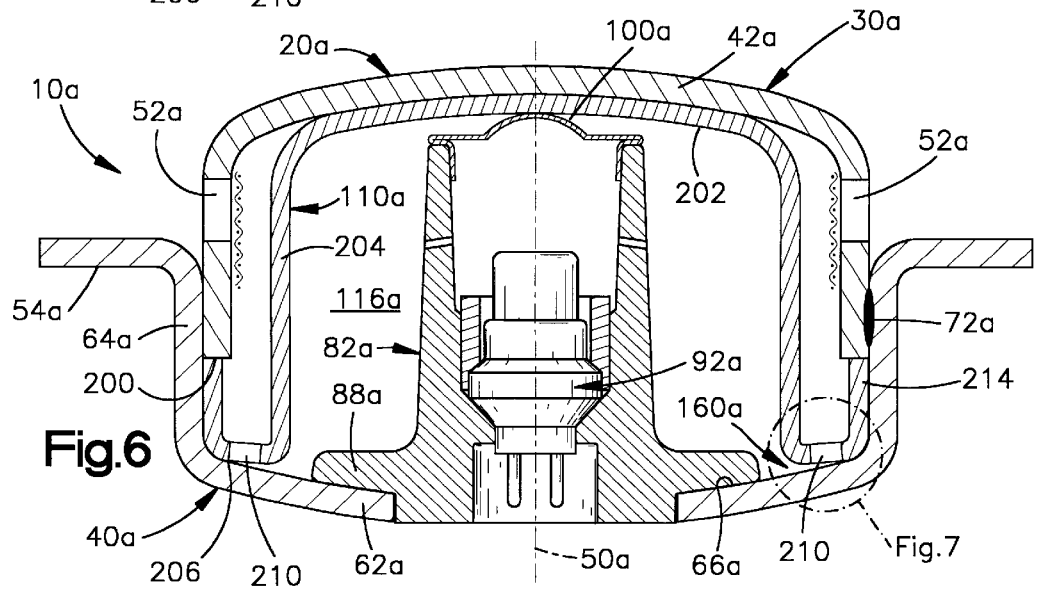
FIG. 6 is a view similar to FIG. 5, showing the inflator in an actuated condition.
Figure 7:
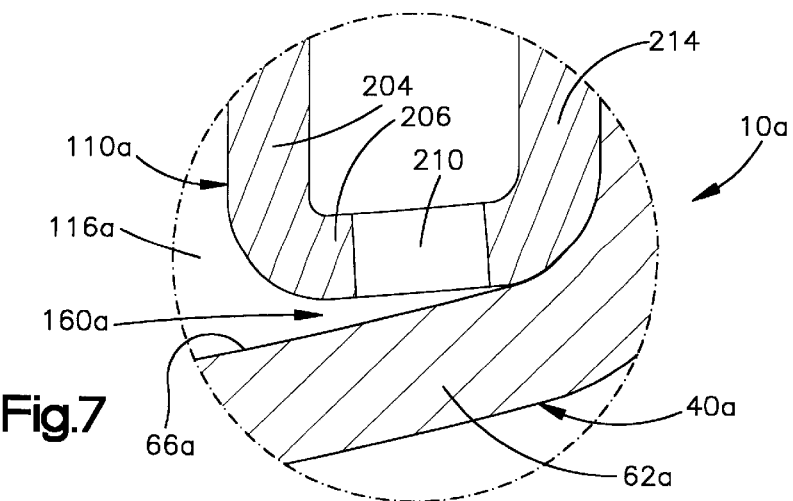
FIG. 7 is an enlarged view of a portion of FIG. 6.

FIGS. 5–7 illustrate an inflator 10a which is constructed in accordance with a second embodiment of the present invention. The inflator 10a is generally similar to the inflator 10, and parts of the inflator 10a which are similar or identical to corresponding parts of the inflator 10 are given the same reference numerals with the suffix "a" added for clarity.

In the inflator 10a, the inflator mounting flange 54a is formed on the lower housing part 40a. The upper housing part 30a has an annular, radially extending end surface 200 which is presented toward the lower housing part 40a, that is, in a downward direction as viewed in FIG. 5.

The combustion cup 110a in the inflator 10a includes a radially extending top wall 202 which overlies a center portion of the end wall 42a of the upper housing part 30a. The top wall 202 of the combustion cup 110a is located between the end cap 100a of the initiator assembly 80a and the end wall 42a of the upper housing part 30a.

The combustion cup 110a includes an axially extending, cylindrical side wall 204. An annular bottom wall 206 of the combustion cup 110a extends radially outward from the side wall 204. The bottom wall 206 overlies a radially outermost portion of the end wall 62a of the lower housing part 40a.

A plurality of control openings 210 are disposed in a circular array in the bottom wall 206 of the combustion cup 110a. Each one of the control openings 210 extends axially through the bottom wall 206. The control openings 210, as a group, have a predetermined maximum flow area which is less than the total flow area of the inflation fluid outlets 52a.

When the wall 206 of the combustion cup 110a is in abutting engagement with the surface 66a of the housing 20a, fluid flow from the combustion chamber 116a to the control openings 210 is blocked. Movement of the wall 206 of the combustion cup 110a to uncover or expose the control openings 210, as described below, enables fluid flow out of the combustion chamber 116a through the control openings 210. The annular space between the wall 206 of the combustion cup 110a and the surface 66a of the housing 20a, together with the control openings 210, forms a control passage 160a in the inflator 10a. When the inflator 10a is in the unactuated condition shown in FIG. 5, the flow area of the control passage 160a is zero. Movement of the combustion cup 110a to move the wall 206 away from the surface 66a and expose the control openings 238, as described below, increases the flow area of the control passage 160a from zero to a positive flow area.

A cylindrical outer wall 214 of the combustion cup 110a extends axially upward (as viewed in FIG. 5) from the bottom wall 206. The outer wall 214 is spaced radially outward from the side wall 204 and is in abutting engagement with the radially extending end surface 200 of the upper housing part 30a. As a result, the combustion cup 110a is trapped or captured axially between the upper housing part 30a and the lower housing part 40a. Specifically, the distance between the top wall 202 and the bottom wall 206 of the combustion cup 110a is selected so that, when the housing parts 30a and 40a are welded together with the combustion cup inside, as viewed in FIG. 5, the combustion cup is resiliently deformed axially inward, from the condition shown in FIG. 6 to the condition shown in FIG. 5. The combustion cup 110a flexes, or deforms, where the bottom wall 206 joins with the side wall 204.

When the inflator 10a is in the unactuated condition shown in FIG. 5, the control openings 210 in the bottom wall 206 of the combustion cup 110a are covered. Upon actuation of the inflator 10a, the inflation fluid source 140a produces inflation fluid under pressure in the combustion chamber 116a. The pressure in the combustion chamber 116a is applied to the end wall 62a of the lower housing part 40a and, through the top wall 202 of the combustion cup 110a, to the end wall 42a of the upper housing part 30a.

The housing part end walls 42a and 62a deform because of the pressure of inflation fluid in the housing 20a, upon actuation of the inflation fluid source 140a. Specifically, the end walls 42a and 62a deflect outwardly, away from each other, from the condition shown in FIG. 5 to the condition shown in FIG. 6. The amount of deflection of the end walls 42a and 62a is dependent on the pressure in the housing 20a; that is, the higher the pressure in the housing, the more the end walls deflect or deform outward.

As a result of the deformation of the end walls 42a and 62a of the housing parts 30a and 40a, the distance between the end wall of the upper housing part and the end wall of the lower housing part increases. The pressure of the inflation fluid in the combustion chamber 116a housing holds the top wall 202 of the combustion cup 110a in engagement with the end wall 42a of the upper housing part 30a. The top wall 202 of the combustion cup 110a moves with the end wall 42a of the upper housing part 30a, away from the end wall 62a of the lower housing part 40a.

The resilience of the combustion cup 110a causes the bottom wall 206 of the combustion cup 110a to move away from the inner side surface 66a of the end wall 62a of the lower housing part 40a. The control openings 210 are then exposed to the combustion chamber 116a. The control passage 160a thus opens, its flow area increasing as the housing 20a deforms. Inflation fluid under pressure flows out of the combustion chamber 116a through the control passage 160a, toward the inflation fluid outlets 52a. The inflation fluid flows through the control passage 160a by way of control openings 210. The fluid outlets 52a direct the inflation fluid to flow out of the housing 20a to the inflatable device 14 (FIG. 1).

The flow area of the control passage 160a varies in accordance with the pressure of inflation fluid in the housing 20a. Specifically, the higher the pressure in the housing 20a, the more the end walls 42a and 62a deflect or deform outward. The more the end walls 42a and 62a deflect outward, the more the bottom wall 206 of the combustion cup 110a moves away from the end wall of the lower housing part 40a, and the bigger the control passage 160a becomes.

Because the flow area of the control passage 160a varies in accordance with the pressure of inflation fluid in the housing 20a, the internal operating pressure of the inflator 10a is self-regulating, as described above with reference to the inflator 10 (FIGS. 2–4). The range of peak operating pressures in the inflator 10a is narrowed, and effects of temperature change on the pressure in the combustion chamber 160a are minimized.

Figure 8:
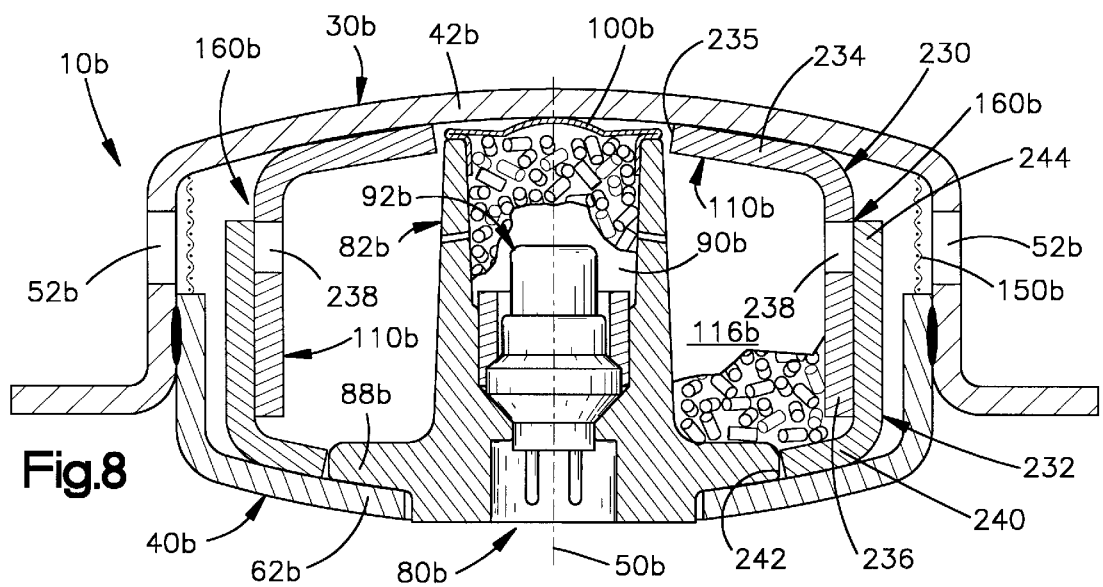
FIG. 8 is a sectional view of an inflator constructed in accordance with a third embodiment of the present invention, showing the inflator in an unactuated condition.
Figure 9:
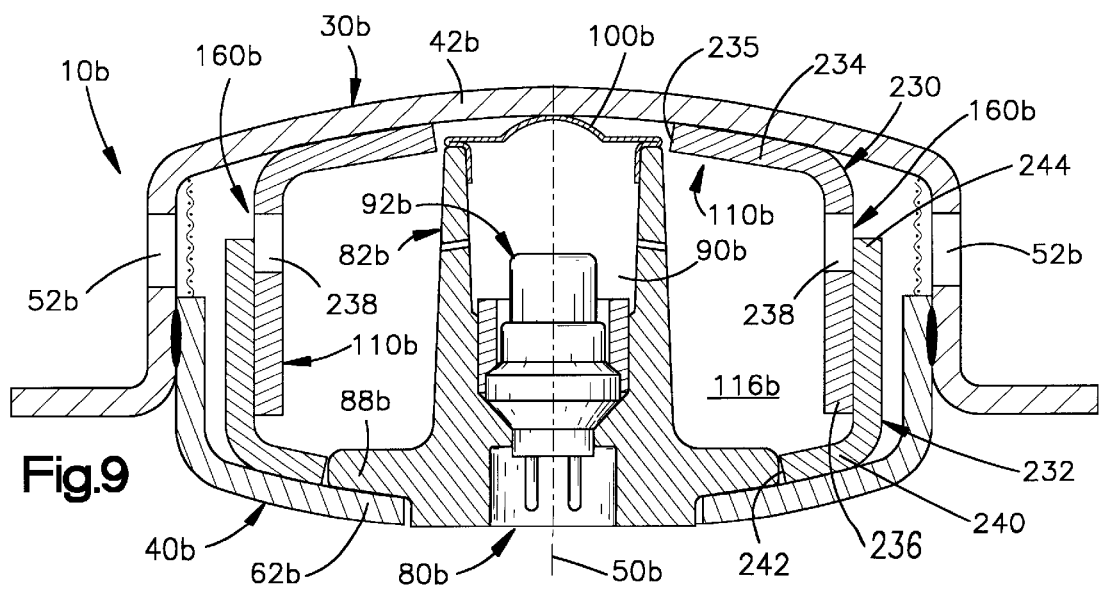
FIG. 9 is a view similar to FIG. 8, showing the inflator in an actuated condition.

FIGS. 8 and 9 illustrate an inflator 10b which is constructed in accordance with a third embodiment of the present invention. The inflator 10b is generally similar to the inflator 10, and parts of the inflator 10b which are similar or identical to corresponding parts of the inflator 10 are given the same reference numerals with the suffix "b" added for clarity.

In the inflator 10b, the combustion cup 110b has a two-part configuration including first and second (upper and lower as viewed in FIG. 8) portions 230 and 232. The upper portion 230 of the combustion cup 110b has a radially extending end wall 234 with a central opening 235 to enable the initiator assembly 80b to engage the end wall 42b of the upper housing part 30b. The upper portion 230 of the combustion cup 110b has an axially extending, cylindrical side wall 236.

A plurality of control openings 238 are disposed in a circular array in the side wall 236 of the upper portion 230 of the combustion cup 110b. Each one of the control openings 238 extends radially through the side wall 236. The control openings 238, as a group, have a predetermined maximum flow area which is less than the total flow area of the inflation fluid outlets 52b.

The lower portion 232 of the combustion cup 110b has a generally radially extending end wall 240 with a central opening 242 to enable the initiator assembly 80b to engage the end wall 62b of the lower housing part 40b. The lower portion 232 of the combustion cup 110b has an axially extending, cylindrical side wall 244 which is slidably received over the side wall 236 of the upper portion 230 of the combustion cup. The side wall 244 of the lower portion 232 of the combustion cup 110b covers and closes the control openings 238 in the upper portion 230 of the combustion cup, when the inflator 10b is in the unactuated condition shown in FIG. 8.

When the control openings 238 are covered by the side wall 244, fluid flow through the control openings is blocked. Movement of the side wall 244 to uncover or expose the control openings 238, as described below, enables fluid flow through the control openings 238. The exposed portions of the control openings 238, as a group, form a control passage 160b in the inflator 10b. When the control openings 238 are covered by the side wall 244, the flow area of the control passage 160b is zero. Movement of the side wall 244 to uncover or expose the control openings 238, as described below, increases the flow area of the control passage 160b from zero to a positive flow area.

Upon actuation of the inflator 10b, the inflation fluid source 140b produces inflation fluid under pressure in the combustion chamber 116b. The pressure in the combustion chamber 116b is applied through the upper portion 230 of the combustion cup 110b to the end wall 62b of the lower housing part 40b and through the lower portion 232 of the combustion cup 110b to the end wall 42b of the upper housing part 30b.

The housing part end walls 42b and 62b deform because of the pressure of inflation fluid in the housing 20b, upon actuation of the inflation fluid source 140. Specifically, the end walls 42b and 62b deflect outwardly, away from each other, from the condition shown in FIG. 8 to the condition shown in FIG. 9. The amount of deflection of the end walls 42b and 62b is dependent on the pressure in the housing 20b. That is, the higher the pressure in the housing 20b, the more the end walls 42b and 62b deflect or deform outward.

As a result of the deformation of the end walls 42b and 62b of the housing parts 30b and 40b, the distance between the end wall of the upper housing part and the end wall of the lower housing part increases. The pressure of the inflation fluid in the combustion chamber 116b holds the upper portion 230 of the combustion cup 110b in engagement with the end wall 42b of the upper housing part 30b. The pressure of the inflation fluid in the combustion chamber 116b also holds the lower portion 232 of the combustion cup 110b in engagement with the end wall 62b of the lower housing part 40b.

As the housing end walls 42b and 62b move away from each other, the upper portion of the combustion cup 110b slides away from the lower portion 232 of the combustion cup. The control openings 238 in the upper portion 230 of the combustion cup 110b are then at least partially exposed. The control passage 160b thus opens, its flow area thus increasing as the housing 20b deforms. Inflation fluid under pressure flows out of the combustion chamber 116b through the control passage 160b, toward the inflation fluid outlets 52b. There is no other path for any significant amount of fluid to flow between the inflation fluid source 140b and the fluid outlets 52b.

The inflation fluid flows through the control passage 160b by way of control openings 238. The fluid outlets 52b direct the inflation fluid to flow out of the housing 20b to the inflatable device 14 (FIG. 1).

The flow area of the control passage 160b varies in accordance with the pressure of inflation fluid in the housing 20b. Specifically, the higher the pressure in the housing 20b, the more the end walls 42b and 62b deflect or deform outward. The more the end walls 42b and 62b deflect outward, the more the lower portion 232 of the combustion cup 110b slides away from the upper portion 230 of the combustion cup, and the greater the flow area of the control passage 160b becomes.

Because the flow area of the control passage 160b varies in accordance with the pressure of inflation fluid in the housing 20b, the internal operating pressure of the inflator 10b is self-regulating, as described above with reference to the inflator 10. The range of peak operating pressures in the inflator 10b is narrowed, and effects of temperature change on the pressure in the combustion chamber 116b are minimized.

From the above description of the invention, those skilled in the art will perceive improvements, changes and modifications in the invention. Such improvements, changes and modifications within the skill of the art are intended to be covered by the appended claims.

Having described the invention, we claim:

1. An apparatus for providing inflation fluid for inflating an inflatable vehicle occupant protection device, said apparatus comprising:

a housing;

an inflation fluid source in said housing actuatable to provide inflation fluid under pressure;

said housing deforming due to the pressure of inflation fluid in said housing upon actuation of said inflation fluid source;

said housing having a fluid outlet for directing flow of inflation fluid out of said housing to the inflatable device;

means for defining, control passage located between said inflation fluid source and said fluid outlet, said control passage having a smaller flow area than said fluid outlet; and means for causing substantially all inflation fluid flowing between said inflation fluid source and said fluid outlet to flow through said control passage;

the flow area of said control passage increasing due to deformation of said housing;

the flow area of said control passage varying in accordance with the pressure of inflation fluid in said housing upon actuation of said inflation fluid source.

2. An apparatus as set forth in claim 1 wherein said means for defining a control passage includes a flow control member at least partially defining a combustion chamber in said apparatus, said flow control member moving relative to said housing upon actuation of said inflation fluid source to vary the flow area of said control passage.

3. An apparatus as set forth in claim 2 wherein said housing includes relatively movable first and second housing parts, said flow control member being movable with said first housing part relative to said second housing part, upon actuation of said inflation fluid source, to move said control passage from a closed condition to an open condition.

4. An apparatus as set forth in claim 3 wherein said flow control member comprises a combustion cup which at least partially encloses said inflation fluid source, said combustion cup having first and second end portions which engage said first and second housing parts, respectively, when said apparatus is in an unactuated condition, said first end portion of said combustion cup moving with said first housing part upon actuation of said apparatus and said second end portion of said combustion cup moving away from said second housing part to move said control passage from the closed condition to the open condition.

5. An apparatus as set forth in claim 1 wherein said housing includes first and second housing parts movable relative to each other upon deformation of said housing, said apparatus comprising an initiator assembly for actuating said inflation fluid source, said initiator assembly having a resilient portion for maintaining said initiator assembly in engagement with said first and second housing parts upon relative movement of said first and second housing parts.

6. An apparatus as set forth in claim 5 wherein said initiator assembly includes an ignition chamber containing an ignition material and an end cap which closes said ignition chamber, said end cap comprising said resilient portion of said initiator assembly, said end cap biasing said initiator assembly into engagement with said housing parts.

7. An apparatus as set forth in claim 1 wherein said means for defining a control passage comprises a combustion cup which at least partially encloses said inflation fluid source and blocks fluid flow between said inflation fluid source and said fluid outlet prior to actuation of said inflation fluid source.

8. An apparatus as set forth in claim 1 wherein said means for causing inflation fluid to flow through said control passage comprises a series of wall portions which enclose said inflation fluid source, said wall portions being free of fluid flow openings between said inflation fluid source and said fluid outlet.

9. An apparatus as set forth in claim 1 comprising a combustion cup and an initiator assembly which are captured axially between end walls of said housing, said combustion cup and said initiator assembly moving relative to said housing upon actuation of said inflation fluid source, the movement of said combustion cup causing said control passage to increase in flow area.

10. An apparatus as set forth in claim 1 wherein said control passage has an annular configuration extending around said inflation fluid source.

11. An apparatus as set forth in claim 1 wherein said control passage is normally closed and blocks fluid flow between said inflation fluid source and said fluid outlet, said apparatus being free of other paths for fluid to flow between said inflation fluid source and said fluid outlet, said control passage opening to enable inflation fluid to flow between said inflation fluid source and said fluid outlet upon actuation of said inflation fluid source.

12. An apparatus as set forth in claim 1 wherein the amount of deformation of said housing varies with the pressure in said housing and the flow area of said control passage varies with the amount of deformation of said housing.

13. An apparatus as set forth in claim 1 wherein said control passage comprises a plurality of fluid flow control openings in a flow control member which moves relative to said housing to increase the flow area of said plurality of fluid flow control openings upon deformation of said housing.

14. An apparatus as set forth in claim 13 wherein said fluid flow control openings extend in an array around said inflation fluid source.

15. An apparatus as set forth in claim 13 wherein said means for defining said control passage comprises a resiliently deformable combustion cup captured axially between end walls of said housing, a portion of said combustion cup moving with a first part of said housing away from a second part of said housing upon actuation of said inflation fluid source, said movement of said portion of said combustion cup causing said control passage to increase in flow area.

16. An apparatus as set forth in claim 1 wherein said means for defining a control passage comprises a pair of members which include at least one fluid flow control opening and which are slidable relative to each other upon actuation of said inflation fluid source to uncover said fluid flow control opening to enable inflation fluid to flow between said inflation fluid source and said fluid outlet.

17. An apparatus as set forth in claim 16 wherein the amount by which said fluid flow control opening opens varies with the amount of relative sliding movement of said pair of members, and the amount of relative sliding movement of said pair of members varies with the amount of deformation of said housing.

* * * * *